United States Patent [19]

Schlegel

[11] 4,021,528

[45] May 3, 1977

[54] PROCESS FOR PREPARING $AlH_3(PO_4)_2 \cdot 3 H_2O$

[75] Inventor: Albert Schlegel, Frankfurt am Main, Germany

[73] Assignee: Hoechst Aktiengesellschaft, Frankfurt am Main, Germany

[22] Filed: Jan. 23, 1975

[21] Appl. No.: 543,496

[30] Foreign Application Priority Data

Jan. 26, 1974 Germany .......................... 2403707

[52] U.S. Cl. .............................. 423/308; 423/305; 423/311; 23/301; 23/305 A
[51] Int. Cl.² ................... C01B 15/16; C01B 25/26
[58] Field of Search ................... 423/365, 307–313; 23/300, 301 R, 305 A

[56] References Cited

FOREIGN PATENTS OR APPLICATIONS 597,169  1/1948  United Kingdom ............... 423/311

OTHER PUBLICATIONS

Journal of American Chemical Society 76, 5951, 1954.

*Primary Examiner*—O. R. Vertiz
*Assistant Examiner*—Gregory A. Heller
*Attorney, Agent, or Firm*—Curtis, Morris & Safford

[57] ABSTRACT

Crystalline $AlH_3(PO_4)_2 \cdot 3H_2O$ is obtained from an aqueous solution of aluminum phosphate containing a molar ratio of $Al_2O_3:P_2O_5$ of from 1:2 to 1:6 and an organic solvent that is miscible with water. The product is useful in diminishing the setting time of hydraulic binders.

16 Claims, No Drawings

PROCESS FOR PREPARING AlH$_3$(PO$_4$)$_2$·3 H$_2$O

The present invention relates to a process for preparing AlH$_3$(PO$_4$)$_2$,3 H$_2$O. It is already known that small quantities of AlH$_3$(PO$_4$)$_2$,3 H$_2$O are formed in the presence of Al PO$_4$, phosphoric acid and water (cf. Journ. Am. Chem. Soc. 76 (1954), 5951). The same applies to the system Al(OH)$_3$, H$_3$PO$_4$ and water (cf. Bull. Soc. chim. France (1961), 2285).

Owing to the fact that a rather long period from several weeks to some months is necessary to obtain but small quantities, these methods of preparation are not practicable.

Considering the fact that AlH$_3$(PO$_4$)$_2$,3 H$_2$O, is a valuable accelerator for setting hydraulically settable mixtures of building materials, an economically attractive process for preparing it was required.

A process for preparing AlH$_3$(PO$_4$)$_2$,3 H$_2$O has now been found by crystallization from an aqueous aluminium phosphate solution having a molar proportion of Al$_2$O$_3$ to P$_2$O$_5$ of from 1 : 2 to 1 : 6, which comprises adding to said solution an organic solvent miscible with water.

According to this process AlH$_3$(PO$_4$)$_2$,3 H$_2$O may be rapidly prepared with excellent yields (of more than 90% of the theory). A molar proportion of Al$_2$O$_3$/P$_2$O$_5$ of from approximately 1 : 2.5 to 1 : 3.2, particularly of from 1 : 3.0, is especially advantageous. In the latter case either pure Al(H$_2$PO$_4$)$_3$ may be used as starting material and be reacted with water and solvents, whereby a reaction according to the following equation takes place:

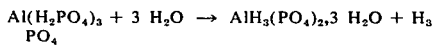

or isolating Al(H$_2$PO$_4$)$_3$ may be advantageously dispensed with, because its preparation is very complicated. It is quite sufficient to start with solutions of a similar composition (e.g. having the same molar proportion of Al$_2$O$_3$/P$_2$O$_5$ i.e. of about 1 : 3) which may be easily prepared e.g. from aluminium hydroxide and phosphoric acid and to add water soluble organic solvents thereto. Starting solutions having other molar proportions of Al$_2$O$_3$/P$_2$O$_5$ may also be used.

The reaction time required according to the aforesaid process may be further reduced by slightly increasing the reaction temperature. The temperature, however, is not a critical factor. The process may be carried out at all temperatures, at which water or organic solvents neither solidify nor boil. Temperatures of from 15° to 50° C are advantageous. Temperatures of from 30° to 40° C are especially advantageous.

It is surprising that the desired phosphate AlH$_3$(PO$_4$)$_2$,3H$_2$O may be prepared from Al(H$_2$PO$_4$)$_3$ according to the process of the invention, since it is known that Al(H$_2$PO$_4$)$_3$ crystals are extremely sensitive to humidity, deliquesce in air giving a clear, viscous liquid and dissolve in a small quantity of cold water to yield a completely clear solution without forming AlH$_3$(PO$_4$)$_2$,3 H$_2$O. It is therefore surprising that yields of AlH$_3$(PO$_4$)$_2$,3 H$_2$O of more than 90% of the theory are obtained by the addition of the organic solvent.

A small quantity of water is required to permit growing of the AlH$_3$(PO$_4$)$_2$,3 H$_2$O crystals in the mother liquor. The yield of the aforesaid product, however, decreases with an increasing water content. It is therefore advantageous to start with highly concentrated aluminium phosphate solutions.

Greater quantities of free phosphoric acid cause a reduction of the yield of AlH$_3$(PO$_4$)$_2$,3 H$_2$O. It is therefore advantageous to start with aluminium phosphate solutions having already an atomic ratio of Al/P of from about 1 : 2 to 1 : 3 since relatively little phosphoric acid accumulates in the mother liquor in the course of the crystallization process in this case.

Examples of suitable solvents are those miscible with water to an unlimited extent. Alcohols having from 1 to 3 carbon atoms, carboxylic acids having from 1 to 3 carbon atoms, acetonitrile, acetone, dioxane and tetrahydrofurane have proved advantageous. Ethanol has proved especially advantageous.

Glycerin cannot be used perhaps due to the fact that the high viscosity of the solution considerably slows down the growing of the crystals. A series of solvents miscible with pure water to an unlimited extent form two liquid phases with the aluminium phosphate solution, but after precipitation of the crystalline AlH$_3$(PO$_4$)$_2$,3 H$_2$O one liquid phase is only present (for example: tetrahydrofurane, isopropanol).

Solvents miscible with water to a limited extent may also be used. It has become evident that solvents having a solubility in water at room temperature of about 1 to 10% may be used. Among these solvents there may be mentioned for example ketones having from 4 to 6 carbon atoms such as methyl isobutylketone or cyclohexanone, carboxylic acid alkyl ester having from 2 to 4 carbon atoms such as for example methyl or ethyl formiate or methyl acetate and aliphatic alcohols having from 4 to 6 carbon atoms such as isoamyl alcohol or cyclohexanol.

Solvents boiling at a temperature below 100° C are advantageous for an easier recovering of the organic solvent by distillation.

A suitable solvent added in the crystallization process generally should have the following caracteristics:

a. It should dissolve Al(H$_2$PO$_4$)$_3$ readily.

b. It should readily dissolve the byproduct H$_3$PO$_4$ formed.

c. It should not dissolve AlH$_3$(PO$_4$)$_2$,3 H$_2$O and thus act as a precipitating agent.

d. It should be well miscible with H$_2$O.

e. It should reduce the viscosity of the solution.

The optimal quantity of the solvent added depends on the water content of the aluminium phosphate solution and of the relation Al$_2$O$_3$ : P$_2$O$_5$. The greater the content of free phosphoric acid and unreacted water, the more organic solvent is required for improving the yield. Contents of from 40 to 90% by volume of organic solvent have proved advantageous. Especially in the case of ethanol the quantities of organic solvent to be added range of from 50 to 400 ml/mole of residual phosphoric acid.

An especially advantageous method of the process according to the invention consists in recycling the mother liquors to the process after treating them so that a complete conversion is obtained.

In the preparation of AlH$_3$(PO$_4$)$_2$,3 H$_2$O from crystallized Al(PO$_4$)$_3$ according to the equation

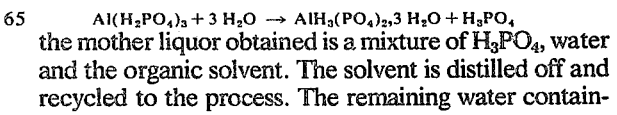

the mother liquor obtained is a mixture of H$_3$PO$_4$, water and the organic solvent. The solvent is distilled off and recycled to the process. The remaining water containing $H_3PO_4$ may be reused for preparing the starting product.

In the preparation of $AlH_3(PO_4)_2, 3\ H_2O$ from an aluminium phosphate solution having approximately the composition $Al_2O_3 : P_2O_5 = 1 : 3$ according to the equations

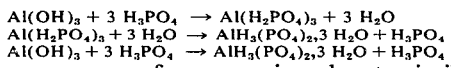

$$Al(OH)_3 + 3\ H_3PO_4 \rightarrow Al(H_2PO_4)_3 + 3\ H_2O$$
$$Al(H_2PO_4)_3 + 3\ H_2O \rightarrow AlH_3(PO_4)_2, 3\ H_2O + H_3PO_4$$
$$Al(OH)_3 + 3\ H_3PO_4 \rightarrow AlH_3(PO_4)_2, 3\ H_2O + H_3PO_4$$

in the presence of an organic solvent miscible with water, the mother liquor obtained is a solution wherein the complete quantity of water of the originally used diluted $H_3PO_4$ is accumulated.

The organic solvent is advantageously distilled off and recycled to the process. The remaining diluted $H_3PO_4$ may be reused as follows:

a. $H_3PO_4$ is concentrated up to the original content by distilling off the excess of water and is recycled to the process.
b. The original concentration of unconsumed $H_3PO_4$ is obtained by adding $P_2O_5$ or highly concentrated $H_3PO_4$ and $H_3PO_4$ is reused.
c. The diluted $H_3PO_4$ is used for producing further products (for example complex fertilizers), wherein the low content of aluminium phosphate does not matter.

$AlH_3(PO_4)_2, 3\ H_2O$ is a white, finely cristalline powder resistant to humid atmospheres.

It has been found that $AlH_3(PO_4)_2, 3\ H_2O$ can be used as an important accelerator for the setting of hydraulically settable mixtures of building materials such as methyl cellulose containing premixed plasters and flooring plaster materials, preferably cement bound.

It is already known that the setting and, consequently, the hardening of cement and other hydraulic binders may be accelerated by the addition of various chemicals.

Additions of chlorides such as calcium or aluminium chloride, alkali silicates, alkali carbonates and alkali phosphates are often used for this purpose.

These additions generally have certain disadvantages; the chlorides, for example, stimulate corrosion, the alkali salts increase the content of water soluble salts and cause efflorescences.

It has been proved that the setting process, for example, of methyl cellulose containing hydraulically setting premixed plasters may be essentially accelerated without any inconvenience by adding to the plaster mixture a small quantity of finely divided acid aluminium phosphate of the formula $AlH_3(PO_4)_2, 3H_2O$. This addition is advantageously maintained in the range of from 0.02 to 10% calculated on the hydraulic binder or of from 0.05 to 5% calculated on the dry mixture of building material.

It has been proved that the time required till the beginning of the setting of the hydraulic binder when not using an addition of $AlH_3(PO_4)_2, 3\ H_2O$ can be reduced half or up to a quarter or less depending on the quantity of the addition of $AlH_3(PO_4)_2, 3\ H_2O$.

The following data show the effect obtained by the addition of acid aluminium phosphate according to the invention, the setting time of a lime-cement plaster without or with methyl cellulose being determined by means of the Vicat conus apparatus (DIN 1168). This measuring method was chosen in accordance with the treating method of premixed plasters mechanically applied in a single coat.

| Plaster mixture consisting of: | Time of setting: |
|---|---|
| 200 p.b.w. of Portland cement 100 p.b.w. of white lime hydrate 700 p.b.w. of quartz sand of from 0 to 0.6 mm without addition of accelerator | about 290 minutes |
| with the addition of 1 p.b.w. of methyl cellulose | about 330 minutes |
| without the addition of methyl cellulose but with the addition of 5 p.b.w. of $AlH_3(PO_4)_2, 3\ H_2O$ | about 75 minutes |
| with the addition of 1 p.b.w. of methyl cellulose 5 p.b.w. of $AlH_3(PO_4)_2, 3\ H_2O$ | about 90 minutes |

From the aforesaid data it can be seen that the setting process is extremely accelerated by acid aluminium phosphate.

The process according to the invention may be advantageously used for accelerating the setting process especially of such hydraulic plaster materials containing non-ionic cellulose ethers for the purpose of improving the adhesion and the water retention properties.

It is already known that said hydraulic binders show a considerable retardation of the setting process. Owing to the fact that the setting time required for hydraulically bound plasters containing cellulose ethers and processed by hand or mechanically is too long and the operation process is considerably impeded, the addition of the aforesaid setting accelerator offers real advantages. The finishing of the plasters can be effected after 1 to 2 hours whereas hydraulic plasters which have not been accelerated can only be smoothed after 4 to 5 hours.

The processibility of a plaster accelerated by acid aluminium phosphate can be additionally improved by adding low additions of from 0.01 to 0.1% of an air entraining agent which additionally reduces the crack formation.

$AlH_3(PO_4)_2, 3\ H_2O$ may be used alone or combined with aluminium hydroxides or alkali phosphates for obtaining a determined setting curve.

$AlH_3(PO_4)_2, 3\ H_2O$ or the combination thereof with further accelerators may be added to the plaster mixture by grinding it with the binder or by adding it to the premixed plaster. When adding the substance to the precast plaster a fineness of less than 100 $\mu$ is required in order to obtain a maximum effect.

Examples for using $AlH_3(PO_4)_2, 3\ H_2O$ in mixtures of building materials:

| EXAMPLE I | 700 p.b.w. of sand (quartz or limestone sand) of from 0 to 1 mm |
| --- | --- |
| | 200 p.b.w. of Portland cement |
| | 100 p.b.w. of white lime hydrate |
| | 0.5 p.b.w. of an air entraining agent |
| | 1.5 p.b.w. of methyl hydroxyethyl cellulose |
| | 5.0 p.b.w. of $AlH_3(PO_4)_2, 3\ H_2O$ |
| EXAMPLE II | 750 p.b.w. of sand (quartz or limestone sand) of from 0 to 1 mm |
| | 250 p.b.w. of highly hydraulic lime |
| | 0.5 p.b.w. of an air antraining agent |
| | 1.5 p.b.w. of methyl hydroxyethyl cellulose |
| | 5.0 p.b.w. of $AlH_3(PO_4)_2, 3\ H_2O$ |
| EXAMPLE III | 700 p.b.w. of sand (quartz or limestone sand) of from 0 to 1 mm |
| | 100 p.b.w. of Portland cement clinkers |
| | 150 p.b.w. of limestone flour |

-continued

| | |
|---|---|
| | 50 p.b.w. of white lime hydrate |
| | 0.5 p.b.w. of air entraining agent |
| | 1.5 p.b.w. of methyl hydroxyethyl cellulose |
| | 0.5 p.b.w. of AlH$_3$(PO$_4$)$_2$,3 H$_2$O |
| EXAMPLE IV | |
| | 800 p.b.w. of sand (quartz or limestone sand) of from 0 to 1 mm |
| | 200 p.b.w. of Portland cement |
| | 0.5 p.b.w. of air entraining agent |
| | 1.5 p.b.w. of methyl hydroxyethyl cellulose |
| | 5.0 p.b.w. of AlH$_3$(PO$_4$)$_2$,3 H$_2$O |
| EXAMPLE V | |
| | 850 p.b.w. of chalky sandstone reactor material |
| | 100 p.b.w. of Portland cement |
| | 50 p.b.w. of lump slag |
| | 0.5 p.b.w. of air entraining agent |
| | 1.5 p.b.w. of methyl hydroxyethyl cellulose |
| | 5.0 p.b.w. of AlH$_3$(PO$_4$)$_2$,3 H$_2$O |
| EXAMLE VI | |
| | 300 p.b.w. of Portland cement |
| | 700 p.b.w. of sand of from 0 to 1 mm |
| | 3 p.b.w. of AlH$_3$(PO$_4$)$_2$,3 H$_2$O |
| | 0.5 p.b.w. of air entraining agent |

The following examples illustrate the invention.

EXAMPLE 1

50gms of Al(H$_2$PO$_4$)$_3$ were mixed by stirring with 50 ml of ethanol giving a slurry and 25.5 mls of H$_2$O were slowly introduced, i.e. gradually added. Thereafter the finely divided slurry was inoculated with AlH$_3$(PO$_4$)$_2$,3 H$_2$O and abandoned for 6 days at a temperature of about 20° C while frequently stirring. The crystalline slurry was then filtered off with suction, impressed on a clay plate and dried at the air after washing it with ether or alcohol. Yield of AlH$_3$(PO$_4$)$_2$,3 H$_2$O : 41 g = 95% of the theory.

EXAMPLE 2

The example was carried out as example 1, but by using acetone instead of ethanol and the mixture was treated as described in example 1.

Yield of AlH$_3$(PO$_4$)$_2$,3 H$_2$O : 39 g = 91% of the theory.

EXAMPLE 3

The starting mixture prepared was the same as in example 1, but the reaction mixture was allowed to stand at a temperature of from 35° to 40° C after inoculating it. It could already be treated after 4 days according to example 1.

Yield of AlH$_3$(PO$_4$)$_2$,3 H$_2$O : 40 g = 93% of the theory.

EXAMPLE 4

78 g of Al(OH)$_3$ (= 1 mole) and 387 g of a 76% H$_3$PO$_4$ (= 3 moles of H$_3$PO$_4$) were mixed while stirring giving a suspension, which suspension was then heated while stirring to a temperature of from 35° to 40° C. The temperature of the reaction mixture then gradually increased due to the reaction heat without adding heat from the outside and reached from 105° to 110° C, whereby the reaction mixture considerably foamed for a short period. A clear solution was obtained, otherwise a brief heating is required.

After cooling to 35° C AlH$_3$(PO$_4$)$_2$,3 H$_2$O was inoculated into the solution while vigorously stirring and the solution was abandoned at a temperature of 35° C over night while frequently stirring. The reaction product was then cooled to room temperature, 200 ml of ethanol were slowly introduced, i.e. gradually added, while stirring and the mixture was allowed to stand for 24 hours while frequently stirring. Then it was filtered off with suction and centrifuged.

The crystals obtained were washed with alcohol in order to remove the adherent H$_3$PO$_4$ and dried at the air or in vacuo (at 25° C).

Yield of AlH$_3$(PO$_4$)$_2$,3 H$_2$O : from 247 to 255 g = 90 − 95% of the theory.

What is claimed is:

1. A process for preparing crystalline AlH$_3$(PO$_4$)$_2$·3H$_2$O by crystallization from an aqueous solution which comprises preparing a mixture of Al(H$_2$PO$_4$)$_3$ and an organic solvent miscible with water, slowly adding water to said mixture to form an aqueous solution, crystallizing AlH$_3$(PO$_4$)$_2$·3H$_2$O from said solution and recovering crystalline AlH$_3$(PO$_4$)$_2$·3H$_2$O.

2. The process of claim 1, wherein the organic solvent is a member selected from the group consisting of alcohols having from 1 to 3 carbon atoms, carboxylic acids having from 1 to 3 carbon atoms, acetonitrile, acetone, dioxane and tetrahydrofurane.

3. The process of claim 1, wherein the organic solvent is a member selected from the group consisting of ketones having from 4 to 6 carbon atoms, carboxylic acid esters having from 2 to 4 carbon atoms and aliphatic alcohols having from 4 to 6 carbon atoms.

4. The process of calim 1, wherein the solvent is a member selected from the group consisting of methyl isobutylketone, cyclohexanone, methyl formiate, ethyl formiate, methyl acetate, isoamyl alcohol and cyclohexanol.

5. The process of claim 1, wherein AlH$_3$(PO$_4$)$_2$·3H$_2$O crystals are added to the solution before the organic solvent.

6. The process of claim 1, wherein AlH$_3$(PO$_4$)$_2$·3H$_2$O crystals are added to the solution after the organic solvent.

7. The process of claim 1, wherein the aqueous solution of Al$_2$O$_3$:P$_2$O$_5$ is obtained by reacting aluminum hydroxide and phosphoric acid in the solution.

8. The process of claim 1, wherein the aqueous solution comprises an aluminum phosphate.

9. The process of claim 1, wherein 40 to 90% by volume of an organic solvent is added to the aqueous solution.

10. The process of claim 1, wherein 50 to 400 ml. of organic solvent per mole of residual phosphoric acid are added to the aqueous solution.

11. The process of claim 1, wherein Al(H$_2$PO$_4$)$_3$ is mixed with ethanol, water is slowly added to the mixture to obtain an aqueous solution, AlH$_3$(PO$_4$)$_2$·3H$_2$O crystals are added to the solution, crystallization of AlH$_3$(PO$_4$)$_2$·3H$_2$O from the solution is carried out at a temperature of about 20° C and crystalline AlH$_3$·(PO$_4$)$_2$·3H$_2$O is separated therefrom.

12. The process of claim 1, wherein Al(H$_2$PO$_4$)$_3$ is mixed with acetone, water is slowly added to the mixture to form an aqueous slurry, AlH$_3$(PO$_4$)$_2$·3H$_2$O crystals are added to the slurry, crystallization of AlH$_3$·(PO$_4$)$_2$·3H$_2$O from the slurry is carried out at a temperature of about 20° C, and crystalline AlH$_3$(PO$_4$)$_2$·3H$_2$O is recovered from the slurry.

13. The process of claim 11, wherein the crystallization is carried out at a temperature of 35°–40° C.

14. The process of claim 1, wherein aluminum hydroxide is reacted with a concentrated aqueous solution of phosphoric acid to obtain an aluminum phosphate solution $AlH_3(PO_4)_2 \cdot 3H_2O$ crystals are added to the aqueous solution, ethanol is then slowly added, $AlH_3(PO_4)_2 \cdot 3H_2O$ is crystallized from solution at about room temperture and crystalline $AlH_3(PO_4)_2 \cdot 3H_2O$ is separated from the aqueous solution.

15. A process for preparing crystalline $AlH_3(PO_4)_2 \cdot 3H_2O$ by crystallization, which comprises preparing an aqueous solution containing a molar ratio of $Al_2O_3$:$P_2O_5$ of from 1:2 to 1:6, slowly adding to said solution an organic solvent miscible with water, adding $AlH_3(PO_4)_2 \cdot 3H_2O$ crystals to said solution, crystallizing $AlH_3(PO_4)_2 \cdot 3H_2O$ from solution and separating crystalline $AlH_3(PO_4)_2 \cdot 3H_2O$.

16. A process for preparing crystalline $AlH_3(PO_4)_2 \cdot 3H_2O$ by crystallization, which comprises preparing an aqueous solution containing a molar ratio of $Al_2O_3$:$P_2O_5$ of from 1:2 to 1:6, adding $AlH_3(PO_4)_2 \cdot 3H_2O$ crystals to said solution, slowly adding an organic solvent miscible with water to said solution, crystallizing $AlH_3(PO_4)_2 \cdot 3H_2O$ from solution and recovering crystalline $AlH_3(PO_4)_2 \cdot 3H_2O$.

* * * * *